United States Patent [19]

Reiman

[11] 4,260,301
[45] Apr. 7, 1981

[54] MULTIPLE SPINDLE DRILLING APPARATUS

[76] Inventor: Leroy A. Reiman, 1725 Scraton St. South, St. Petersburg, Fla. 33771

[21] Appl. No.: 61,838

[22] Filed: Jul. 30, 1979

[51] Int. Cl.³ .............................................. B23B 39/16
[52] U.S. Cl. ...................................................... 408/47
[58] Field of Search .................. 408/47, 53, 42; 74/67

[56] References Cited

U.S. PATENT DOCUMENTS

| | | | |
|---|---|---|---|
| 1,326,863 | 12/1919 | Heinkel | 408/47 X |
| 2,342,251 | 2/1944 | Burt | 408/47 |
| 2,522,736 | 9/1950 | Zagar | 408/47 X |

*Primary Examiner*—Harrison L. Hinson

*Attorney, Agent, or Firm*—Duckworth, Hobby et al., Attorneys at Law

[57] ABSTRACT

The present invention contemplates a multiple spindle drill having a housing with an internal cavity, with plural machining elements extending through a face plate, each element including a crank on the internal extremity. A driver plate in the cavity has plural holes therein for engaging all of the cranks of the machining elements on one side thereof, and an offset drive hole on the opposite side, with a drive shaft having a crank at the internal end thereof for engaging the driver plate in the drive hole for purposes of eccentrically rotating the drive plate to thereby rotate the machining elements in the desired manner.

12 Claims, 4 Drawing Figures

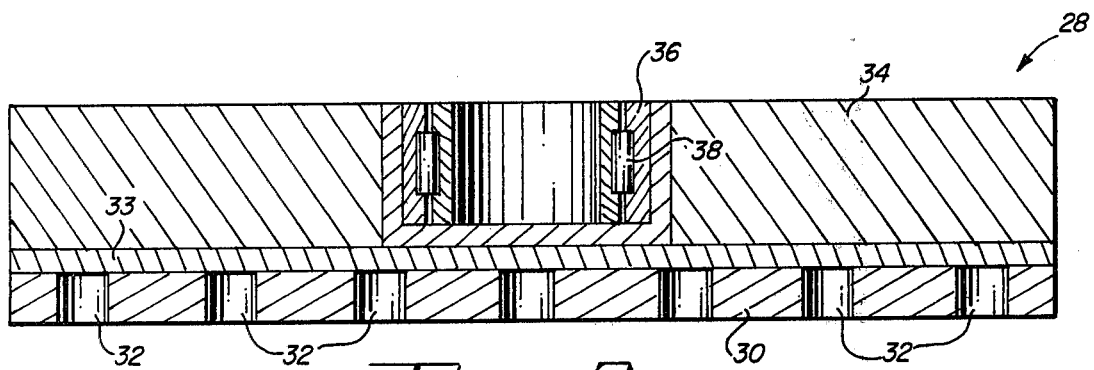
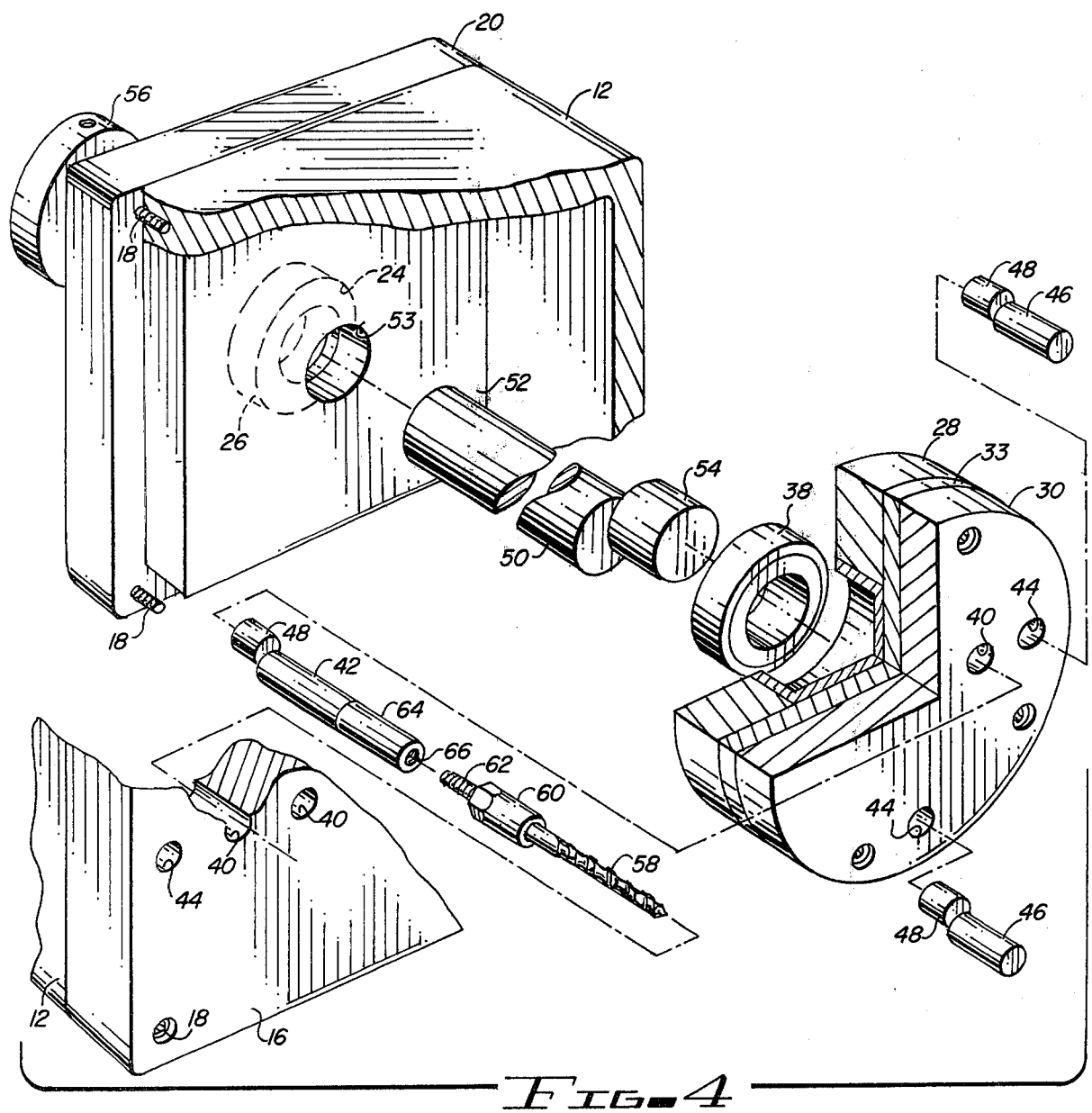

MULTIPLE SPINDLE DRILLING APPARATUS

BACKGROUND OF THE INVENTION

1. Field of the Invention

The present invention relates to multiple spindle machining apparatus, and particularly to a type of multiple spindle drill which is adapted for drilling closely spaced holes in an economical and facile manner.

2. Description of the Prior Art

In the manufacture of certain types of electrical equipment, notably aircraft instruments, it is frequently necessary to drill small, closely spaced holes in the work.

In U.S. Pat. No. 2,342,251, Burt discloses multiple spindle drilling apparatus in which each drill bit extends through a face plate and a housing, and includes a crank at the internal extremity thereof, which crank is coupled to a drive plate, which is in turn, rotated by a main drive shaft. The arrangement disclosed by Burt employs an oiling system in which the drill splindles are oiled during operation. According to the teachings of Burt, the driver plate comprises a pair of sandwiched members, one of which has holes extending therethrough for engagement with the crank pins of all of the drive spindles.

In U.S. Pat. No. 3,606,559, Fitch, et al, teach a multiple spindle arrangement for a drilling machine, which likewise employs a crank pin arrangement like that disclosed by Burt. A similar crank pin arrangement is disclosed in U.S. Pat. No. 3,559,495 to Ludwig. Other prior art of interest includes U.S. Pat. No. 1,870,391 to Stimpson; and U.S. Pat. No. 3,682,560 To Suizu.

The machine structures illustrated in the prior art references discussed above serve a useful purpose where a particular drilling jig may be set up to drill thousands, or tens of thousands of a particular type of product. However, in low volume manufacturing jobs, such as those related to aircraft instruments of the type referred to above, it may be necessary to drill closely spaced, multiple holes in a particular type of work, but in which the spacing is the same only for a few hundred operations. Under these conditions, it is necessary to employ different structures and techniques than those taught in the above referenced patents, in order that the tooling costs do not render such multiple spindle drilling jigs unprofitable.

SUMMARY OF THE INVENTION

The present invention is directed to a low-cost, high quality multiple spindle machining apparatus, particularly adapted for use as a multiple spindle drilling machine which is capable of permitting efficient, inexpensive drilling of a small number of units, but which has sufficient structural integrity to permit high volume drilling operations as well.

A machining apparatus as contemplated by the present invention comprises a housing having an internal cavity, with a face plate mounted at one end of the housing and having plural holes extending therethrough. The apparatus includes plural machining elements, such as drill bits, with each machining element extending through one of the holes in the face plate and including a crank at the internal extremity thereof. A driver plate is positioned in the cavity, and has plural holes extending therein from one side with the crank of one of the machining elements extending into each hole of the driver plate. The driver plate further includes a drive hole extending therein from a side of the driver plate opposing the one side, with a drive shaft extending into the cavity and having a crank at the extremity thereof engaging the driver plate in the drive hole.

In accordance with another aspect of the present invention, the driver plate comprises first and second layers of relatively soft material with the plural holes extending through the first layer and the offset drive hole extending into the second layer. The driver plate is provided with a relatively hard wear plate sandwiched between the first and second layers and in contact with the extremity of the crank of each of the machining elements, thus serving as a wear plate in abutment with the internal extremity of each machining element.

In accordance with another aspect of the preferred embodiment of the present invention, each machining element comprises a drill bit formed of a shank portion and a drill portion, and further includes means for removably fastening the drill portion with the shank portion.

THE DRAWING

FIG. 3 is a cross-section of another portion of the apparatus shown in FIG. 1.

FIG. 4 is an exploded view of a portion of the machining apparatus shown in FIG. 1.

DETAILED DESCRIPTION

Figure 1:
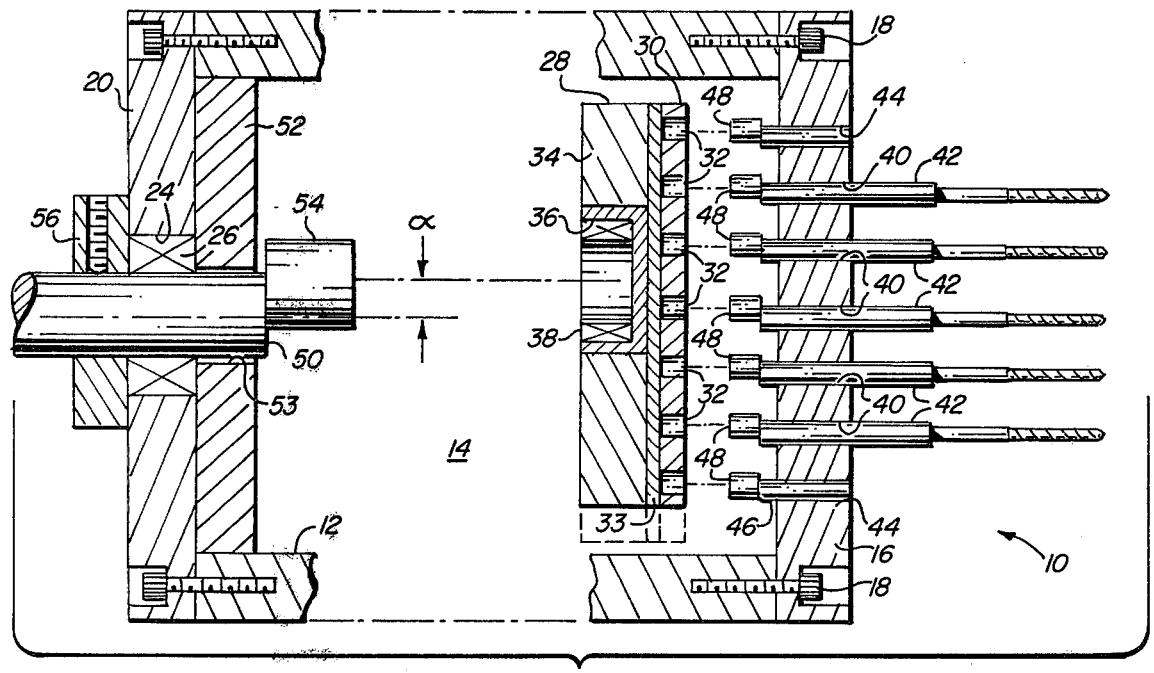
FIG. 1 is a cross-sectional elevation of machining apparatus in accordance with the present invention.

A preferred embodiment of the present invention will now be described with reference to FIGS. 1-4.

Noting FIG. 1, the machining apparatus of the present invention, referred to generally by the reference numeral 10, includes various constituent parts, such as a housing 12, face plate 16, drill bits 42 (and associated cranks 48), driver plate 28, drive shaft 50 (with crank 54) as well as other specific features, all of which are described in greater detail below.

Figure 2:
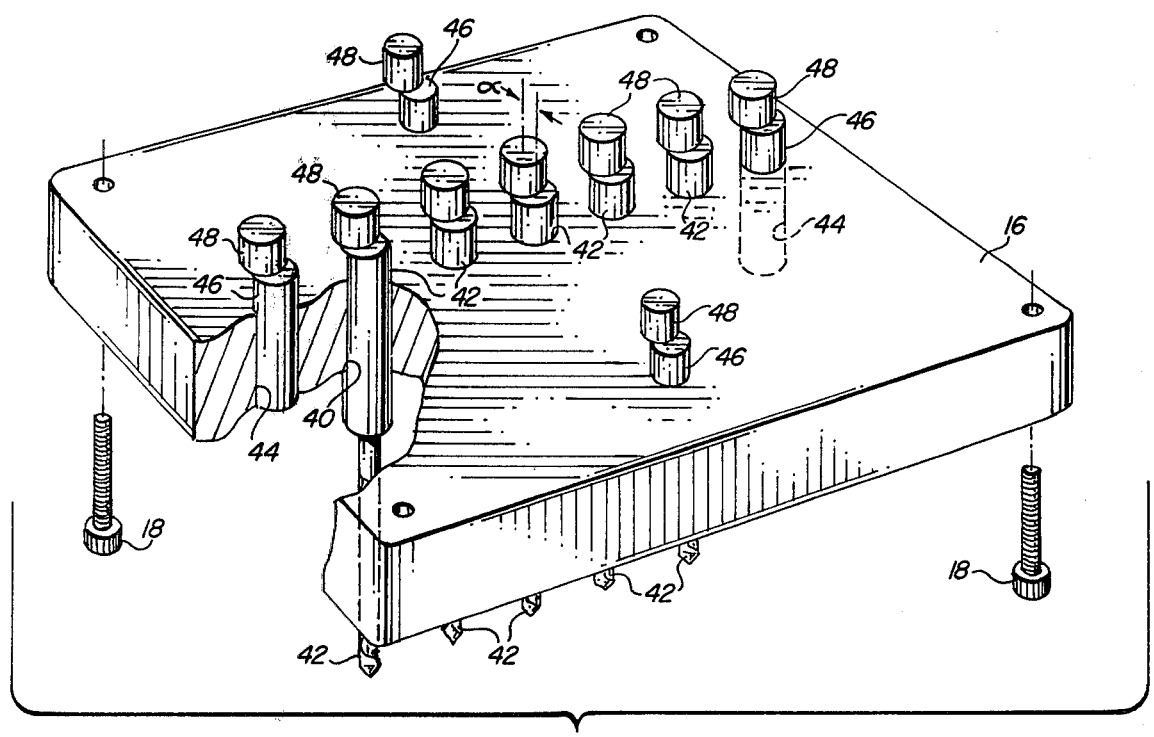
FIG. 2 is a perspective view of a portion of the apparatus shown in FIG. 1.

With specific reference to FIGS. 1, 2 and 3, the housing 12 may be machined from aluminum or similar material to form an internal cavity 14. A face plate 16 is mounted in an open end of the cavity 14, and is fastened to the housing 12 by screws or similar fasteners. A support plate 20 extends across the other end of the cavity 14 opposite the face plate 16, and may be integrally formed with the housing 12. The support plate 20 includes a central drive shaft hole 24 with a circular bearing 26 fitted in the hole 24.

The apparatus 10 further includes a driver plate 28 rotatably positioned within the cavity 14. The driver plate 28 includes a brass layer 30 having plural crank holes 32 extending from the outer surface thereof. The driver plate 28 further includes a plastic or brass layer 34 spaced from the brass layer 30 by a spring steel wear plate 33. The layer 34 includes a drive hole 36 extending from the outer surface thereof and having a bearing 38 positioned in the drive hole 36. (Note FIG. 3).

With continuing reference to FIGS. 1 and 2, the face plate 16 includes plural, parallel holes 40 extending therethrough, each hole 40 receiving a drill bit 42 therein. The face plate 16 further includes plural guide pin holes 44 with a guide pin 46 in each hole 44. Each of the drill bits 42 and guide pins 46 includes a crank 48 at the extremity thereof which extends into the cavity 14.

The axis of each crank is offset from the axis of the associated drill bit 42, or guide pin 46, a distance which is denoted in FIG. 2 by the Greek letter alpha. Each crank 48 extends into an associated one of the crank holes 32 of the driver plate 28, such that each guide pin 46 and drill bit 42 is rotatable with the circulatory i.e. eccentric, motion of the driver plate 28. As is clearly shown in FIG. 1, the driver plate has an outer peripheral dimension which is somewhat less than the inner peripheral dimensions of the cavity 14, to permit the driver plate 28 to move in a circular fashion.

The apparatus 10 further includes a drive shaft 50 extending through the support plate hole 24 and the associated bearing 26. The drive shaft 50 further extends through a support plate 52 having a hole 53 therein to receive the drive shaft. The drive shaft 50 further includes a drive crank 54 at the extremity thereof extending into the cavity 14, the center axis of the crank 54 being offset from the center of the drive shaft 50 by a dimension represented by the Greek letter alpha in FIG. 1. A collar 56 surrounds the drive shaft 50 in abutment with the outside sufface of the support plate 20.

Specific reference is now made to FIG. 4. Each drill bit 42 includes a drill portion 58 having a sleeve 60 and a threaded extremity 62. Each drill bit 42 further includes a shank portion 64 and a threaded hole 66 adapted to receive the threaded end 62 of the drill portion 58. The shank portion 64 of the drill bit 42 is dimensioned so as to extend outside of the outer surface of the face plate 16, in order to permit rapid changes of any one of the drill bit portions 58, in the event that any one or more drill bit portions become damaged.

In the preferred embodiment of the present invention, the housing 12 (FIG. 1) is rectangular in shape, as is shown by the shape of the face plate 16 in FIG. 2.

The manner of operation of the machine apparatus 12 will now be described with reference to FIGS. 1 through 4, inclusive.

The apparatus 10 is assembled with the power drive crank 54 extending into the drive hole 36 of the driver plate 28. On the opposing side, each of the cranks 48 associated with the guide pins 44 and the drill bits 42 extends into a corresponding crank hole 32 of the driver plate 28. The drive shaft 50 is then coupled to a power drive mechanism, such as a milling machine head, or the like, so as to rotate the drive shaft 50 in a conventional manner. Rotation of the drive shaft 50 causes the crank 54 to orbit about the central axis of the drive shaft 50, thus causing the driver plate 28 to rotate about the cavity 14. The engagement of the cranks 48 in the holes 32 causes those cranks 48 to orbit about the central axis of the corresponding guide pin 46 or drill bit 42. Rotation of the drill bits 42 while being forced into a work (not shown) causes a hole to be drilled in the desired manner. The guide pins 46 serve to guide the driver plate 28 in its path about the central axis of the drive shaft 50.

A most important aspect of the present invention is the use of the wear plate 33 between the layers 30 and 34 of the driver plate 28. As noted above, this wear plate 33 preferably comprises a hardened steel layer, which reduces the amount of wear damage to the driver plate 28, while permitting the use of a relatively soft material for the layer 30 in order to serve as a good bearing surface for each crank 48 in the corresponding crank hole 32.

As noted above, the outer periphery of the housing 12 is preferably formed in a rectangular fashion, so that at least one side of the housing 12 is flat, permitting the housing to be slid along a supporting surface adjacent the work.

As noted with respect to FIG. 4, each drill bit 42 is provided with means for permitting the drill portion 58 to be removed, without requiring entry into the housing 12.

I claim:

1. Machining apparatus comprising:
   a housing having an internal cavity;
   a face plate mounted on one end of said housing, said face plate having plural holes extending therethrough;
   plural drill bits, each bit extending through one of said holes in said face plate and each bit including a crank at an extremity thereof extending into said housing;
   a driver plate in said cavity, said driver plate having plural holes extending therein from one side of said driver plate with the crank of at least one of said bits extending into each hole of said driver plate;
   said driver plate further including a driver hole extending therein from a side of said driver plate opposing said one side;
   a drive shaft extending into said cavity and having a crank at the extremity thereof engaging said driver plate in said drive hole for eccentric rotation of said driver plate;
   support means for said drive shaft at the end of said housing opposing said one end;
   bearing means between said crank of said drive shaft and said driver plate; and wherein
   said driver plate comprises:
   first and second layers of relatively soft material, said plural holes extending through said first layer and said drive hole extending into said second layer; and
   a relatively hard wear plate between said first and second layers and in contact with the extremity of said crank of each said drill bit.

2. The machining apparatus recited in claim 1, further comprising bearing means between said drive shaft and said support means.

3. The machining apparatus recited in claim 2, further comprising a spacer plate in abutment with said support means and surrounding said drive shaft.

4. The machining apparatus recited in claim 1, further comprising:
   said face plate having plural guide holes extending therein from a side opposing said one side of said driver plate;
   said driver plate having plural guide holes extending therein from said one side, each guide hole in said driver plate corresponding to one of said guide holes in said face plate; and
   plural guide pins, each guide pin extending into one of said guide holes of said face plate and each guide pin further including a crank extending into one of said guide holes of said driver plate.

5. The machining apparatus recited in claim 1, wherein said housing includes a flat side along the outer periphery thereof, said flat side being parallel with said machining elements.

6. The machining apparatus recited in claim 1, wherein each machining element comprises:
   a drill bit formed of a shank portion and a drill portion; and means for removably fastening said drill portion with said shank portion.

7. The machining apparatus recited in claim 1, wherein the center line of said crank for each machining element is offset from the center line of the corresponding machining element a dimension equal to the offset between the center line of said drive shaft and its corresponding crank.

8. Machining apparatus comprising:
a housing having an internal cavity;
a face plate mounted at one end of said housing, said face plate having plural holes extending therethrough;
plural machining elements, each machining element extending into one of said holes in said face plate and each machining element including a crank at an extremity thereof extending into said housing;
a driver plate in said cavity, said driver plate formed of first layer of relatively soft material, with said first layer having plural holes extending therein with the crank of at least one of said machining elements extending into each hole of said first layer, said driver plate further including a second relatively hard wear plate in contact with the extremity of each crank of all of said machining elements; and
a drive shaft extending into said cavity and having a crank at the extremity thereof engaging said driver plate for eccentric rotation of said driver plate.

9. Machining apparatus recited in claim 8, wherein said housing includes a flat side along the outer periphery thereof, said flat side being parallel with said machining elements.

10. The machining apparatus recited in claim 8, wherein each machining element comprises:
a drill bit formed of a shank portion and a drill portion; and
means for removably fastening said drill portion with said shank portion.

11. The machining apparatus recited in claim 8, further comprising:
said face plate having plural guide holes extending therein from a side opposing said one side of said driver plate;
said driver plate having plural guide holes extending therein from said one side, each guide hole in said driver plate corresponding to one of said guide holes in said face plate; and
plural guide pins, each guide pin extending into one of said guide holes in said face plate, and each guide pin further including a crank extending into one of said guide holes of said driver plate.

12. The machining apparatus recited in claim 11, wherein each said machining element comprises a drill bit.

* * * * *